PULSE CODE MODULATION SYSTEM

Filed Feb. 6, 1956 3 Sheets-Sheet 1

INVENTORS,
DONALD L. JACOBY
BERNARD J. KEIGHER
ALFRED MACK
BY Harry M. Saragovitz
ATTORNEY June 17, 1958 D. L. JACOBY ET AL 2,839,728

PULSE CODE MODULATION SYSTEM

Filed Feb. 6, 1956 3 Sheets-Sheet 2

INVENTORS
DONALD L. JACOBY,
BERNARD J. KEIGHER,
ALFRED MACK.

BY Harry M. Saragovitz
ATTORNEY.

June 17, 1958 D. L. JACOBY ET AL 2,839,728

PULSE CODE MODULATION SYSTEM

Filed Feb. 6, 1956 3 Sheets-Sheet 3

INVENTORS,
DONALD L. JACOBY,
BERNARD J. KEIGHER,
ALFRED MACK.

BY Harry M. Saragovitz
ATTORNEY 2,839,728

PULSE CODE MODULATION SYSTEM

Donald L. Jacoby, Elberon, Bernard J. Keigher, Shrewsbury, and Alfred Mack, Little Silver, N. J., assignors to the United States of America as represented by the Secretary of the Army Application February 6, 1956, Serial No. 563,816

6 Claims. (Cl. 332—1)

(Granted under Title 35, U. S. Code (1952), sec. 266)

The invention described herein may be manufactured and used by or for the Government for governmental purposes, without the payment of any royalty thereon.

This invention relates to a pulse code modulation system for the conveying of information and more particularly to a pulse code modulation system which is capable of operating over a channel or system link having relatively narrow band-pass capabilities.

It is, of course, known in the art that pulse codes may be used to convey information and that the use of such codes results in a great reduction in the amount of power over that required for other systems. The disadvantage of the use of pulse codes, particularly where the information is to be transmitted over an appreciable distance, is that these codes require a system having wide band-pass characteristics. This factor has limited the use of such pulse codes where wire lines or radio links are involved as a part of the system.

In a system constructed in accordance with the principles of the present invention the broad band-pass requirement normally associated with pulse code systems is greatly reduced while the advantage of reduced power requirements over other types of system is retained. Essentially the invention involves the conversion of intelligence carried in one type of pulse code to equivalent information in a second pulse code having a slower bit or digit repetition rate. The second pulse code is then used to modulate a sinusoidal alternating voltage which in turn is fed to the transmission medium of the system.

One mode of practicing the invention, for example, may be used where information exists in the form of a conventional binary code. This information is first converted to equivalent information in a quaternary code form which is utilized to modulate a "carrier" voltage at the original "bit" or digit frequency of the binary signal. The modulated "carrier" signal may then be transmitted over a system link or element having only one-half the bandwidth that would be required to transmit the binary information in its original form. The binary and quaternary codes are set out only by way of illustration and example and it will readily be apparent that the principles of this invention may be applied to other forms of pulse codes and to other frequencies of "carrier" voltage.

It is the principal object of the present invention to reduce the bandwidth requirements for pulse code modulation systems.

It is a further object of the invention to devise a novel method for the transmission of pulse code information.

It is a still further object of the invention to provide a pulse code conversion apparatus.

It is yet another object of the invention to provide a novel modulator system.

Further objects and many attendant advantages of the invention will become apparent as the same becomes better understood from the following detailed description taken in conjunction with the accompanying drawings wherein.

Figure 1:
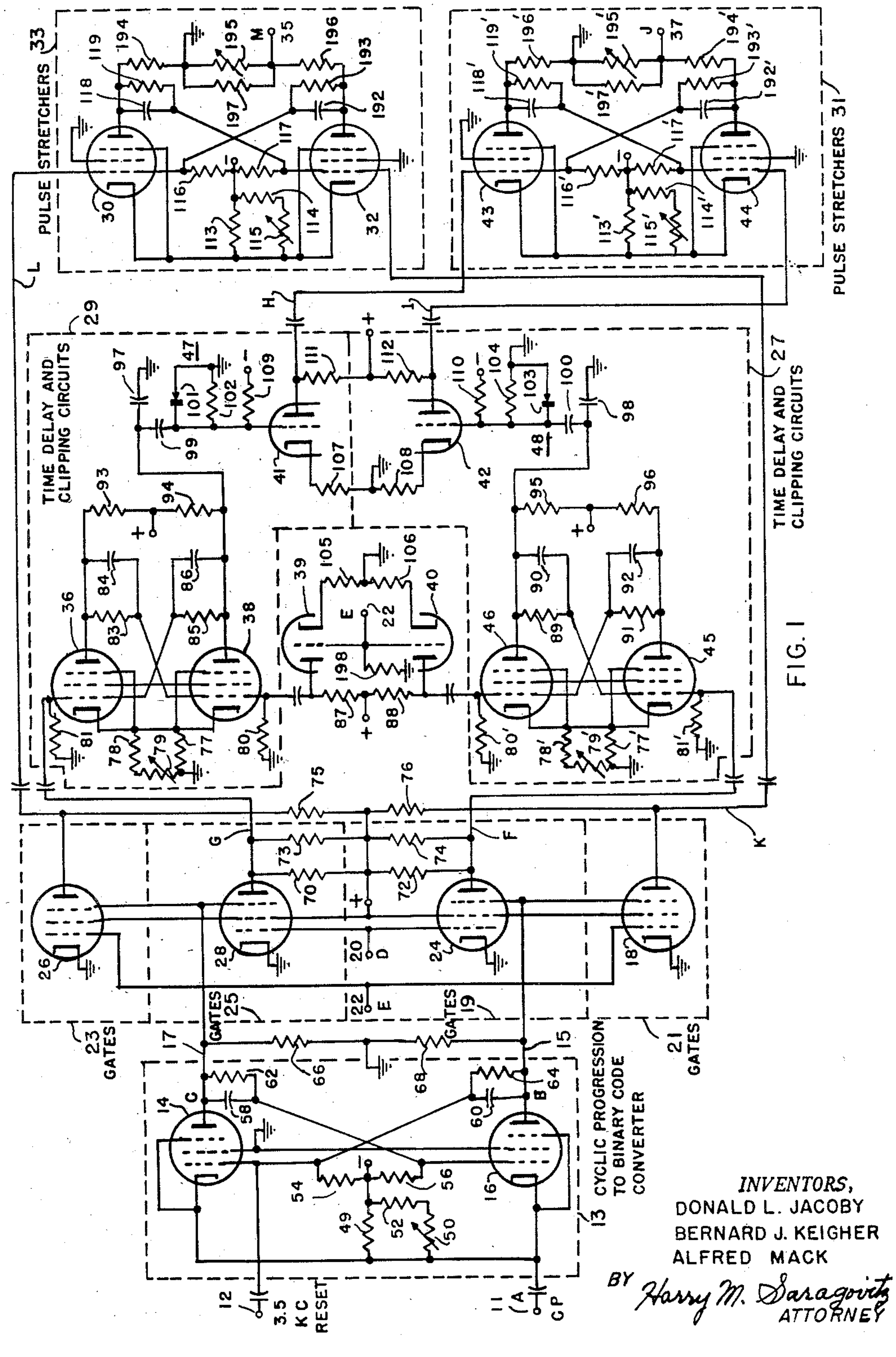
Figure 1 is a circuit diagram in schematic form of a converter for changing cyclic progression coded information to quaternary form.
Figure 2:
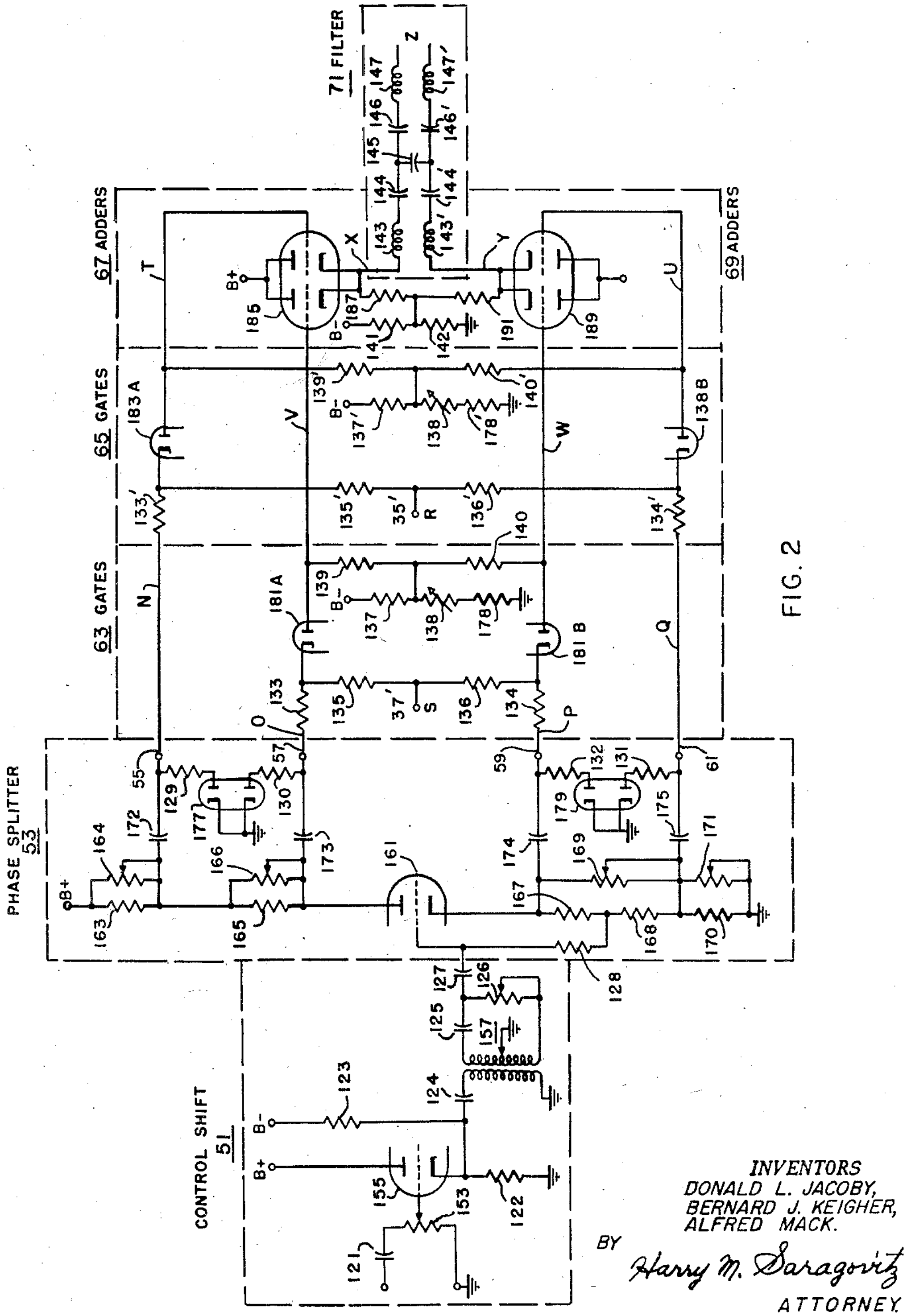
Figure 2 is a circuit diagram, also in schematic form, of a line modulator circuit.
Figure 5:
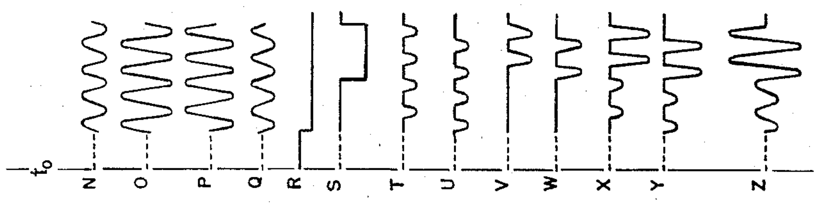
Figure 4:
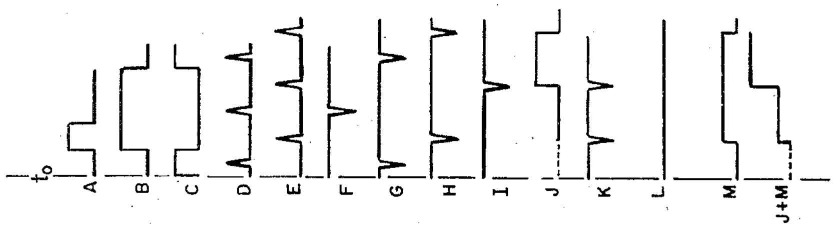
Figure 3:
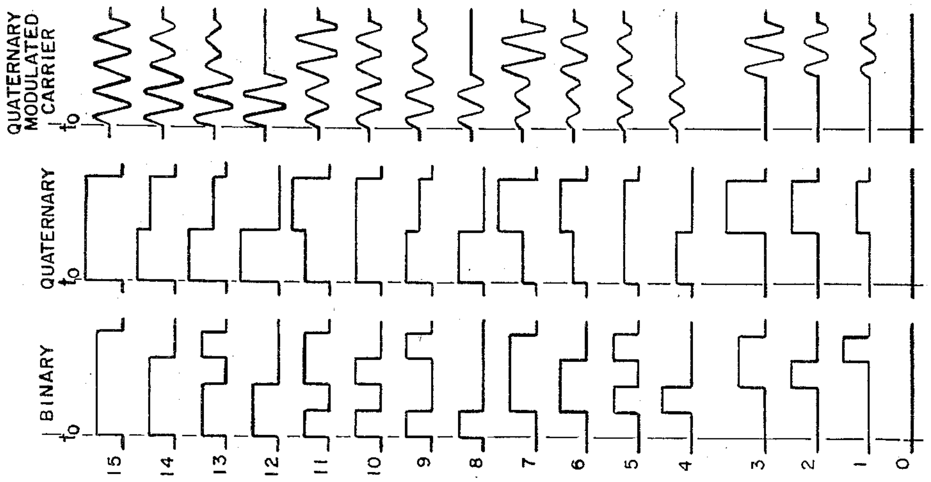

Figure 3 is a schematic representation of the waveforms of coded information in binary, quaternary and modulated forms as they appear at input, intermediate and output portions of the combined circuits of Figures 1 and 2, and Figures 4 and 5 are schematic diagrams of the voltage waveforms at various designated portions of the circuits of Figures 1 and 2 with a particular code character applied to the input circuit of Figure 1. Figures 4 and 5 are plotted on identical time scales with the zero or reference time indicated thereon.

In general, the system of the presently preferred embodiment to be described is one in which input information is applied in the form of a cyclic progression code which through the operation of a converter circuit is converted to characters in four digit binary code. The four digit binary information is further converted to information in a quaternary code which in turn is used to modulate an alternating current wave. The modulated alternating current is then applied through a Gaussian filter to a telephone line or other system medium for transmission to the receiving end of the system.

Referring first to Figure 1 of the drawings a portion of the system has been shown which is made up of the converter of the cyclic progression code to binary code and the further conversion of the binary code to a quaternary code. The diagram of Figure 1 includes a schematic of all the elements involved in the system but these elements fall into groups each having its own definite function to perform and they may be more easily described in terms of the functions of each group. The various element groups have therefore been segregated by dotted line enclosures each of which has been designated by a reference character and given an appropriate legend to indicate its function in the conversion operation.

The input signal in the form of a cyclic progression code is applied to an input terminal 11 connected to a cyclic progression to binary code converter element 13. The converter element 13 will be more fully described hereinafter but for the present it is sufficient to state that it consists of a multivibrator circuit having a pair of output leads 15 and 17. The output lead 15 carries a positive pulse code modulated voltage output. The output lead 17 carries a negative pulse code modulated voltage output. The lead 15 is connected to and applies its voltage as one input to each of a pair of gate circuits 19 and 21. Similarly the lead 17 is connected to and applies its voltage as one input to each of a pair of gate circuits 23 and 25.

The gate circuits 19 and 25 include second input circuits which are connected to a pulse voltage source 20. The gate circuits 21 and 23 also include second input circuits which are connected to a second pulse voltage source 22. The pulse voltage sources have the same pulse repetition rate but the pulses of the two sources are time displaced with respect to one another in a manner to be more fully described hereinafter. All of the gate circuits are so arranged as to be conducting only when positive input pulses are applied to the second input circuit, during a binary pulse.

The output circuit of gate circuit 19 is connected to the input of a time delay and clipping circuit 27 and the output of the gate circuit 25 is connected to the input of a time delay and clipping circuit 29. The delay and clipping circuits 27 and 29 also have second input circuits thereof connected to the pulse voltage source 22 through phase inverter tubes. The delay portion of the circuits 25 and 27 consists essentially of multivibrator circuits which are initially triggered by pulses passed by the respective gate circuits 25 and 19 and are restored to their original conductive state by pulses from the source 22. The purpose of the clipping portions of these circuits which include the resistance shunted diodes in the input circuit of the output amplifiers of these circuits is to discard or shunt to ground the leading edge of the wave applied thereto and to preserve and pass on the trailing edge of the wave.

The outputs of the delay and clipping circuits 27 and 29 are fed respectively to first and second input circuits of a pulse stretcher 31. The pulse stretcher 31 is a multivibrator circuit adapted to be triggered by a pulse on one input thereof and returned to its initial state by a pulse on the other input circuit as will be more fully described in connection with the description of the operation of the system.

A second pulse stretcher 33 has a pair of inputs connected to the output from the gate circuits 21 and 23. The pulse stretcher 33 is essentially a multivibrator circuit and operates in the same manner as pulse stretcher 31 previously described.

Pulse stretchers 31 and 33 are equipped with output terminals 27 and 35. The output terminal 37, connected to pulse stretcher 31, is a quaternary output terminal and is designated as the "weight of 2" output terminal. The ouput terminal 35, connected to pulse stretcher 33, is a quaternary output terminal and is designated the "weight of 1" output terminal. The reason for this designation will become apparent in the description of the operation of the circuit.

The "weight of 1" and "weight of 2" components of the quaternary code are not combined in the converter but are supplied directly to the modulator where the combining is accomplished in connection with the modulation.

In the modulator as shown in Figure 2 of the drawings a 14-kilocycle "carrier" is supplied through condenser 121 to a control and phase shift circuit 51 in which sufficient phase shift is introduced to cause the sine wave to be at 0° at the start of a quaternary character code group as provided by the circuit of Figure 1. This signal is then supplied to a phase splitter 53 which also includes voltage dividing networks to provide sine waves of two opposite phases and at two different levels. The output line 55 provides a sine wave of one amplitude, the output line 57 a sine wave of the same phase but of double amplitude, the output line 59 a sine wave of the latter amplitude but of opposite phase, and the line 61 a sine wave of the same phase as that of line 59 but of the same amplitude as that of line 55.

The signals on lines 57 and 59 are then controlled in a first gating circuit 63 by the "weight of 2" input received from the quaternary output terminal 37 of the converter to provide 14-kilocycle signals of an amplitude corresponding to such "weight of 2" inputs. The signals on lines 55 and 61 are also controlled in a second gating circuit 65 by the "weight of 1" input received from the quaternary output terminal 35 of the converter. The signals of corresponding phase from lines 55 and 57 as controlled by the gating circuits are then combined in an adder circuit 67 and similarly the two signals from lines 59 and 61 both of opposite phase to the signals in lines 55 and 57 are combined in a second adder circuit 69. Such adding of the two signals completes the forming of the quaternary code from the two components received as "weight of 1" and "weight of 2" inputs. The two combined signals of opposite phase are then combined in push-pull and supplied to a Gaussian filter 71 which serves to reduce the amplitude of those signals at other than the 14-kilocycle "carrier" frequency.

The various important waveforms of voltage with respect to time for all possible signal inputs to the system have been plotted in Figure 3. These voltages are plotted upon equal scale horizontal time axes and have been grouped vertically in accordance with the type of code or modulation involved. The zero or reference point, $t_0$, of the time axes is at the left-hand end of each waveform. The left-hand column indicates all sixteen possible combinations of information available in a four digit binary code. These waveforms exist in the present system on lead 15 of Figure 1. The second column represents the same information converted into a quaternary code. These wave forms illustrated here have no actual physical existence in the system but would be obtained if the voltages at terminals 35 and 37 of Figure 1 were combined. The third or right-hand column represents the final output voltage, a quaternary modulated alternating voltage that exists at the output terminals of the filter 71 in Figure 2.

The operation of the circuit of Figure 1 will now be described. The presently preferred embodiment of this invention was constructed to operate with a cyclic progression, four digit code having a digit occurrence or repetition rate of 14 kilocycles per second. This cyclic progression code voltage is applied to the input terminal 11 of the cyclic to binary converter 13. Terminal 11, it will be noted, is connected to the cathodes of a pair of tubes 14 and 16 connected in a conventional bistable multivibrator circuit with their plates and grids cross-coupled through RC circuits. A reset pulse voltage is applied to an input terminal 12 which is connected as shown to the control grid of the tube 14. The reset voltage is intended to establish the original state of equilibrium in the circuit 13 at the beginning of each character code group. This reset voltage is a negative pulse voltage occurring at one quarter the repetition frequency of the input information or at a 3.5 kilocycle per second repetition rate. At reference time, $t_0$, and at the start of each subsequent character code group the negative reset pulse drives tube 14 to a non-conducting state and tube 16 to a conducting state.

Reference is now made to Figures 4 and 5 of the drawing wherein various waveforms of voltages as they exist at various points in the system are illustrated. These wave forms are plotted on time axes of equal scale and the zero or reference time $t_0$ is indicated in a similar manner to that described in connection with Figure 3. Each wave form has been designated with a letter and the letters have also been applied to various points in the circuits of Figures 1 and 2 where the corresponding voltage wave forms occur. Some of the wave forms illustrated vary with the input signal applied to the system. An input signal has therefore been chosen arbitrarily as the cyclic progression code input corresponding to binary signal 7 of Figure 3. The wave form of this cyclic progression code input is illustrated at A in Figure 4. The voltage A is applied to terminal 11 of Figure 1.

The positive going portion of A renders tube 16 non-conducting and tube 14 conducting. The wave form B appears at the plate of tube 16 and the wave form C appears at the plate of tube 14. Both tubes remain in this state until reset by the next 3.5 kilocycle reset pulse applied to input terminal 12. Waveforms B and C represent the positive and negative pulse code modulated signal in binary form.

Wave form B is applied to one input circuit of gate circuits 19 and 21. Gate circuit 21 which includes tube 18 is opened periodically by a voltage applied to its second input circuit. This voltage is a 7 kilocycle per second pulse illustrated at E in Figure 4. It will be apparent from Figure 4 that for the conditions given gate circuit 21 will open and pass a pulsed wave which is illustrated at K. Gate circuit 19 has a similar 7 kilocycle pulse voltage applied to its second input circuit but it is shifted in time with respect to wave E. This pulse wave is shown at D. For the conditions given therefore, gate circuit 19 opens to pass the pulsed wave illustrated at F in Figure 4 which appears at the plate of tube 24.

The negative pulse code modulated wave form C is applied to one input of the gate circuits 23 and 25. The gate circuit 25 is opened by the pulsed 7 kilocycle per second voltage E applied to its second input and for the conditions given no positive voltage exists on the first input circuit of the gate. The output at the plate of tube 26 is therefore unchanged during character code group. This is shown at L. The gate circuit 25 including the tube 28 has the wave form D applied to its second input as the switching voltage. This results in the wave form G appearing at the plate of tube 28.

The voltages represented by wave forms K and L are applied to separate input circuits of the multivibrator pulse stretcher 33 containing tubes 30 and 32. Circuit 33 is a bistable multivibrator and the incoming pulse K is applied to the grid of tube 32 to render it nonconducting and produce the voltage output illustrated at M at the junction of the two resistors 195 and 196 connected between the plates of tube 32 and ground. The junction point of the two resistors is connected to the quaternary output terminal 35. The output voltage produced at this terminal is representative of the weight of one quaternary output and indicates the presence of a pulse voltage in binary code occurring within the first and third digits of the group. It should be noted that the output pulse M has a positive magnitude level of one unit and begins at the time the binary pulse occurs. They are spread by the action of the pulse stretcher 33 to cover the entire remainder of a character code group four digits in length.

The voltage wave forms F and G detect the presence of binary pulses occurring within the third and first digits of the character code group. These are to be delayed so that they may control a voltage to be superposed upon the M output voltage described above. The delay and clipping circuits are arranged to perform this function.

The pulse wave form G is applied to the grid of a tube 36 in multivibrator tube circuit contained within circuit 29. The negative pulse causes tube 36 to be rendered non-conducting and, through cross-coupling RC circuits between the plate and grid of this tube and a similar tube 38, drives tube 38 conductive. This causes a negative going swing in the plate voltage of tube 38 and the decreased voltage persists since the multivibrator is a bistable circuit. The multivibrator circuit is reset by a pulse applied to the grid of tube 38. The 7 kilocycle per second voltage (wave form E) is applied to the grids of a pair of triode tubes 39 and 40 having their anode cathode circuits connected between the positive source and ground. The positive pulses of the E wave form voltage are converted to negative going pulses having the same position at the plates of the tubes. The negative voltage pulse at the plate of tube 39 is condenser coupled to the grid of tube 38 to restore the multivibrator to its original condition.

To summarize, an output potential at the plate of tube 38 contains a negative going portion, a period of reduced voltage and a subsequent rise or positive going step. This voltage is condenser coupled to a diode shunted resistor clipping circuit 47. The diode shunts the negative going leading edge of the plate voltage wave form to ground and allows the positive going trailing edge to pass to the grid of an amplifier and phase inverter tube 41 having its anode-cathode circuit connected from the positive source to ground. The positive going trailing edge pulse is converted to a negative pulse voltage on the plate of tube 41 and this pulse is in turn applied to the grid of a tube 43 connected with a similar tube 44 in a multivibrator circuit of the pulse stretcher 31.

The wave form F is condenser coupled to the grid of a tube 45 in a bistable multivibrator circuit included in the delay and clipping circuit 27. The multivibrator contains a second tube 46 having its grid and plate elements cross-coupled to those of tube 45 in a conventional manner. The grid of tube 46 is condenser coupled to the plate of tube 40 which as previously described has its grid connected to the source of voltage of waveform E. The plate of tube 46 is also condenser coupled to a diode shunted resistor clipping circuit 48. The output of clipping circuit 48 is connected to the grid of a phase inverting and amplifying tube 42 whose plate is in turn condenser coupled to the grid of tube 44.

The structure and operation of the delay and clipping circuit 27 is the same as that previously described in connection with the delay and clipping circuit 29. The input waveform applied to the grid of tube 45 is that illustrated at F (Figure 4) and the reset voltage applied to the grid of tube 46 is that obtained by inverting the wave form E in tube 40 which has its plate condenser coupled to the grid of tube 46.

The plates of tubes 41 and 42 in the delay and clipping circuits 29 and 27 are condenser coupled to the grid circuits of tubes 43 and 44 respectively of the pulse stretcher circuit 31. The waveform of the voltage applied to the grid of tube 43 is that shown at H (Figure 4). The waveform of the voltage applied to the grid of tube 44 is shown at I (Figure 4).

It will be readily apparent that the negative going pulse in waveform I will cause tube 43 to become nonconducting and drive tube 44 conductive. Since the multivibrator of element 31 is a bistable network this condition will continue until the negative going pulse in waveform I causes tube 44 to be rendered non-conducting and restores tube 43 to a conducting state. The voltage waveform at the junction of series connected resistors 194′ and 195′ in the plate circuit of tube 44 will be that illustrated at J in Figure 4. This voltage is a quaternary representation of the binary pulses in the second and fourth digits of the binary information. The junction point of resistors 194′ and 195′ is directly connected to the output terminal 37 which is the "weight of 2" quaternary output.

The waveform illustrated as $J+M$ in Figure 4 has no physical existence in the apparatus disclosed. The "weight of 1" and "weight of 2" outputs have been combined graphically in Figure 4 to illustrate that if so combined electrically they would represent a true quaternary conversion of the binary signal input. The two outputs are phase inverted and used separately in the modulator of Figure 2 and the modulated outputs are then combined as a total output Z. It will be apparent that the output Z corresponds to the combined form $J+M$ after modulation.

The 14-kilocycle input to the phase shift circuit 51 is supplied through condenser 124, voltage divider 153 and cathode follower tube 155 to a phase shifting network 157. This circuitry facilitates the initial adjustment for proper amplitude and phase of signal to be used in the following components of the system.

The output from phase shift circuit 51 to phase splitter 53 is supplied to the grid of a phase splitting tube 161 having four substantially equal series resistor networks, two in the anode circuit 163—4 and 165—6 and two in the cathode circuit 167—9 and 170—1. The signal on the grid is substantially duplicated in amplitude on the cathode without phase change and on the anode with a complete phase reversal. It is also substantially duplicated, but at half amplitude, at the common terminal of the two cathode resistors 168 and 170 without phase change and at the common terminals of the two anode resistors 163 and 165 with complete phase reversal. These four signals are supplied through coupling condensers 172–175 to the output leads 55, 57, 59, and 61 corresponding respectively to the waveforms N, O, P, Q, assuming an input to the grid of the same form as curve P. Direct-current restorer tubes 177 and 179 are provided to prevent accumulation of a D. C. blocking bias on these output leads.

The signals at full amplitude on output leads 57 and 59 are supplied to diode gates **181*a* and 181*b* together with the "weight of 2" output from the converter of Figure 1 supplied through a phase inverter to the input terminal 37' of gating circuit 63 as the curve "S" corresponding to binary number 7. This output may be considered normally biased to cut off the gates 181*a* and 181*b*, but when a "weight of 2" signal exists the diode gates will pass the full amplitude signals from leads 57 as waveform V and 59 as waveform W. Similarly the signals at half amplitude on leads 55 and 61 are controlled by the "weight of 1" output from the converter of Figure 1 also inverted and applied to gates 183*a* and 183*b* as curve R to pass appropriate half amplitude signals from leads 55 as waveform T and 61** as waveform U.

The signals of reversed phase, both full and half amplitude, V and T passed by the diode gates are combined in adder circuit 67 by means of twin triode tube 185 having its cathodes connected through a common load resistor 187 having a low resistance compared to the plate cathode resistance of the tube. Therefore these signals are effectively added as wave form X. Similarly the signals of unchanged phase, both full and half full and half amplitude, W and U are combined in adder circuit 69 having twin triode 189, as wave form Y.

These two added signals will always be of equal amplitude but opposite phase through each quaternary pulse period. Since each provides only a half-wave rectified output the two together will combine (with X inverted) to provide a full wave signal when supplied in push pull to the output Gaussian filter 71 as in wave form Z. This filter is of conventional design to provide a maximum output at the "carrier" frequency of 14 kilocycles and suppress all frequencies outside the desired band of 4–20 kilocycles. The output Z will be found to correspond to the 14-kilocycle carrier modulated in accordance with the quaternary number 7.

To avoid the need for individually describing all the conventional components associated with each tube circuit they are designated merely by a reference numeral; actual values of all the components utilized in one typical test of the invention are illustrated in the following table.

| Reference numeral | Resistance in Ohms × 1000 |
|---|---|
| 49 | 6.8 |
| 50 | 10 |
| 52 | 1 |
| 54, 56 | 39 |
| 62, 64 | 100 |
| 66, 68 | 3.3 |
| 70, 72 | 10 |
| 73, 74 | 1.2 |
| 75, 76 | 1.5 |
| 77, 77' | 6.8 |
| 78, 78' | 1 |
| 79, 79' | 10 |
| 80, 80', 81, 81' | 39 |
| 83, 85 | 100 |
| 87, 88 | .820 |
| 89, 91 | 100 |
| 93, 94, 95, 96 | 3.3 |
| 102, 104 | 100 |
| 105, 106 | .1 |
| 107, 108 | 2.2 |
| 109, 110 | 1,000 |
| 111, 112 | 1.5 |
| 113, 113' | 6.8 |
| 114, 114' | 1 |
| 115, 115' | 10 |
| 116, 116' | 39 |
| 117, 117' | 39 |
| 119, 119' | 100 |
| 123 | 33 |
| 126, 128 | 1,000 |
| 129, 130 | 150 |
| 131, 132 | 150 |
| 133, 133' | 100 |
| 134, 134' | 100 |
| 135, 135' | 100 |
| 136, 136' | 100 |
| 137 | 100 |
| 137' | 150 |
| 138, 138' | 10 |
| 139, 139' | 47 |
| 140, 140' | 47 |
| 153 | 1,000 |
| 141 | 7.5 |
| 142 | 1.2 |
| 163, 165 | 2.2 |
| 170 | 2.2 |
| 167, 168 | 1 |
| 164, 166 | 50 |
| 169, 171 | 50 |
| 187, 191 | 1 |
| 194 | 3.3 |
| 195, 195' | 10 |
| 196 | 2.7 |
| 197 | .68 |
| 197' | 1 |
| 198 | 100 |
| 178, 178' | |

| Reference numeral: | Capacity $\mu\mu$fd. |
|---|---|
| 58, 60 | 100 |
| 84, 86 | 100 |
| 90, 92 | 72 |
| 97, 98 | 150 |
| 99, 100 | 100 |
| 118, 118' | 100 |
| 121, 124 | 10,000 |
| 125 | 50 |
| 127 | 10,000 |
| 144, 144' | 18,000 |
| 146, 146' | 18,000 |
| 145 | 13,000 |
| 172, 173 | 1,000,000 |
| 174, 175 | 1,000,000 |

| Reference numeral: | Inductance in nh. |
|---|---|
| 143, 143' | 10.5 |
| 147, 147' | 9.5 |

| Reference numeral: | Tube type |
|---|---|
| 14 | 5654 |
| 16 | 5654 |
| 18 | 6AS6 |
| 24 | 6AS6 |
| 26 | 6AS6 |
| 28 | 6AS6 |
| 30 | 5654 |
| 32 | 5654 |
| 36 | 5654 |
| 38 | 5654 |
| 39, 40 | 12AT7 |
| 41, 42 | 12AT7 |
| 43 | 5654 |
| 44 | 5654 |
| 45 | 5654 |
| 46 | 5654 |
| 155, 161 | 12AU7 |
| 177, 181, 179, 183 | 6AL5 |
| 185, 189 | 12AU7 |

The term "carrier" has been used in this disclosure in a somewhat unusual sense. In ordinary TV, radar, radio, and carrier telephony the bandwidth is narrow compared to the carrier frequency and tuned circuits receive many cycles of energy to establish the level of the signal. In the present case the entire signal may be changed every two cycles and the bandwidth therefore must be comparable to the entire signal frequency.

Although binary pulse code modulation is very efficient from the standpoint of the power required, frequently the power requirement is so low that a moderate increase in power would involve no problem. On the other hand, excessive bandwidth may involve interference and frequently is precluded by existing facilities through which the signal is to be transmitted. The most efficient overall system will utilize readily available bandwidth to avoid excessive power, but will also utilize reasonable power to avoid the need for excessive bandwidth.

In the foregoing description of the preferred embodiment one of the simplest possibilities has been illustrated starting with four binary signals and changing to two quaternary signals. However, it will be apparent that one might start with six quaternary signals in each baud and convert to three octonary signals by utilizing the same principles.

It may be noted that if the original binary bits are in weighted order 1, 2, 4, 8 and these are arranged to modulate with 1 and 4 at "weight of 1," and 2 and 8 at "weight of 2," the final quaternary modulated signal will be found to be accurately weighted at 1 and 4. A Shannon decoder set for such a weighting will therefore provide an extremely simple solution to the entire decoding problem.

What is claimed is:

1. A narrow band pulse code modulation system comprising a multivibrator converter system for converting a cyclic progression code input to four digit positive and negative binary pulse code modulated outputs, a first pair of gate means connected to the positive pulse code output of said converter to separate the first and third digit pulses from the second and fourth digit pulses thereof, a second pair of gate means connected to the negative pulse code output of said converter to separate the first and third digit pulses from the second and fourth digit pulses thereof, a first delay circuit connected to one of said first pair of gate means and operative to delay said first and third digit pulses into time coincidence with said second and fourth digit pulses, a second delay circuit connected to one of said second pair of gate means and operative to delay said first and third digit pulses into time coincidence with said second and fourth digit pulses, a first pulse stretcher circuit responsive to the delayed outputs of said first and second delay circuits, a second pulse stretcher circuit responsive to the undelayed outputs of said first and second pairs of gate means, first and second modulator circuits including a source of alternating current and connected respectively to the outputs of said first and second pulse stretcher circuits, and voltage combining means connected to the outputs of said first and second modulator means.

2. A narrow band pulse code modulation system comprising a multivibrator converter system for converting a cyclic progression code input to four digit positive and negative binary pulse code modulated outputs; a first pair of gate means connected to the positive pulse code output of said converter to separate the first and third digit pulses from the second and fourth digit pulses thereof, a second pair of gate means connected to the negative pulse code output of said converter to separate the first and third digit pulses from the second and fourth digit pulses thereof, a first delay circuit connected to one of said first pair of gate means and operative to delay said first and third digit pulses into time coincidence with said second and fourth digit pulses, a second delay circuit connected to one of said second pair of gate means and operative to delay said first and third digit pulses into time coincidence with said second and fourth digit pulses, a first pulse stretcher circuit responsive to the delayed outputs of said first and second delay circuits, a second pulse stretcher circuit responsive to the undelayed outputs of said first and second pairs of gate means; an input circuit adapted to be connected to a source of input alternating voltage, a phase splitter and voltage divider means connected to said input circuit to produce one pair of voltages of one time phase and discrete magnitudes and another pair of voltages of opposite time phase and discrete magnitudes; electronic switching means for each of said discrete magnitude alternating voltages, each connected to, and responsive to one polarity of the output of, one of said pulse stretcher circuits; and means connected to and combining the outputs of all said electronic switch means into a single output alternating voltage.

3. A narrow band pulse code modulation system comprising a source of four successive binary signals in each baud, two sources of pulse energy of the same pulse repetition frequency, one providing pulses synchronized to the first and third signals of each baud and the other to the second and fourth such signals, a first gating circuit responsive to the binary signals and said first pulse energy, a second gating circuit responsive to said binary signals and said second pulse energy, delay means responsive to the output of said first gating circuit to provide a delay equal to the interval between successive binary signals including synchronizing means controlling the delay termination by said second pulse energy to coincide with said second and fourth signal respectively, means to stretch said coincident signals to substantially half the baud length, means to supply carrier energy at a predetermined amplitude and also at half said amplitude, means to modulate said carrier at one amplitude by said first and third delayed and stretched signals and said carrier at the other amplitude by said second and fourth stretched signals, and means to add said modulated outputs, whereby a carrier is provided modulated by two successive quaternary signals in each baud, each such signal being potentially composed of a component corresponding to the first or third signals of each said baud at one amplitude, and to a second or fourth such successive signal respectively at another amplitude.

4. A narrow band pulse code modulation system comprising a source of four successive binary signals in each baud, means to separate the first and third signal of each baud from the second and fourth signal of each baud, means to delay said first and third signals to coincide with said second and fourth signal respectively, means to stretch said coincident signals to substantially half the baud length, means to supply carrier energy at a predetermined amplitude and also at half said amplitude, means to modulate said carrier at one amplitude by said first and third delayed and stretched signals and said carrier at the other amplitude by said second and fourth stretched signals, and means to add said modulated outputs, whereby a carrier is provided modulated by two successive quaternary signals in each baud, each such signal being potentially composed of a component corresponding to the first or third signals of each said baud at one amplitude, and to a second or fourth such successive signal respectively at another amplitude.

5. A narrow band pulse code modulation system comprising a signal source formed with a plurality of equal digit groups in each baud, means to select the corresponding digit signals of each group, means to delay all except the last digit signal of each group to coincide with such last signals, a source of carrier energy of a first amplitude successively halved to provide a discrete amplitude corresponding to each digit signal of a group, means to modulate said first amplitude carrier by one of said selected signals of a group, and each of said discrete successively halved amplitude carriers by the corresponding selected signal of said group, means to add said modulated outputs for each group and means to combine all of the modulated signals of all said groups to provide a carrier having successively halved amplitude components corresponding to the original digit position within the group.

6. A narrow band pulse code modulation system comprising a source of four successive binary signals in each baud, means to select the first and third signal of each baud and to separately select the second and fourth signal of each baud, means to delay said first signals to coincide with said second and fourth signal respectively, means to supply carrier energy at a predetermined amplitude and also at half said amplitude, means to modulate said carrier at one amplitude by said first and third delayed signals and said carrier at the other amplitude by said second and fourth signals, and means to add said modulated outputs whereby a carrier is provided modulated by two successive quaternary signals in each baud, each such signal being potentially composed of a component corresponding to the first or third signals of each said baud at one amplitude, and a second or fourth such successive signal at another amplitude.

References Cited in the file of this patent

UNITED STATES PATENTS 1,789,364 Hansell ---------------- Jan. 20, 1931